May 13, 1969 — T. I. MONROE ET AL — 3,443,378
HYDROSTATIC SINGLE UNIT STEERING SYSTEM
Filed April 4, 1967 — Sheet 1 of 5

INVENTORS
THOMAS I. MONROE
RAYMON L. GOFF

BY *[signature]* ATTORNEYS

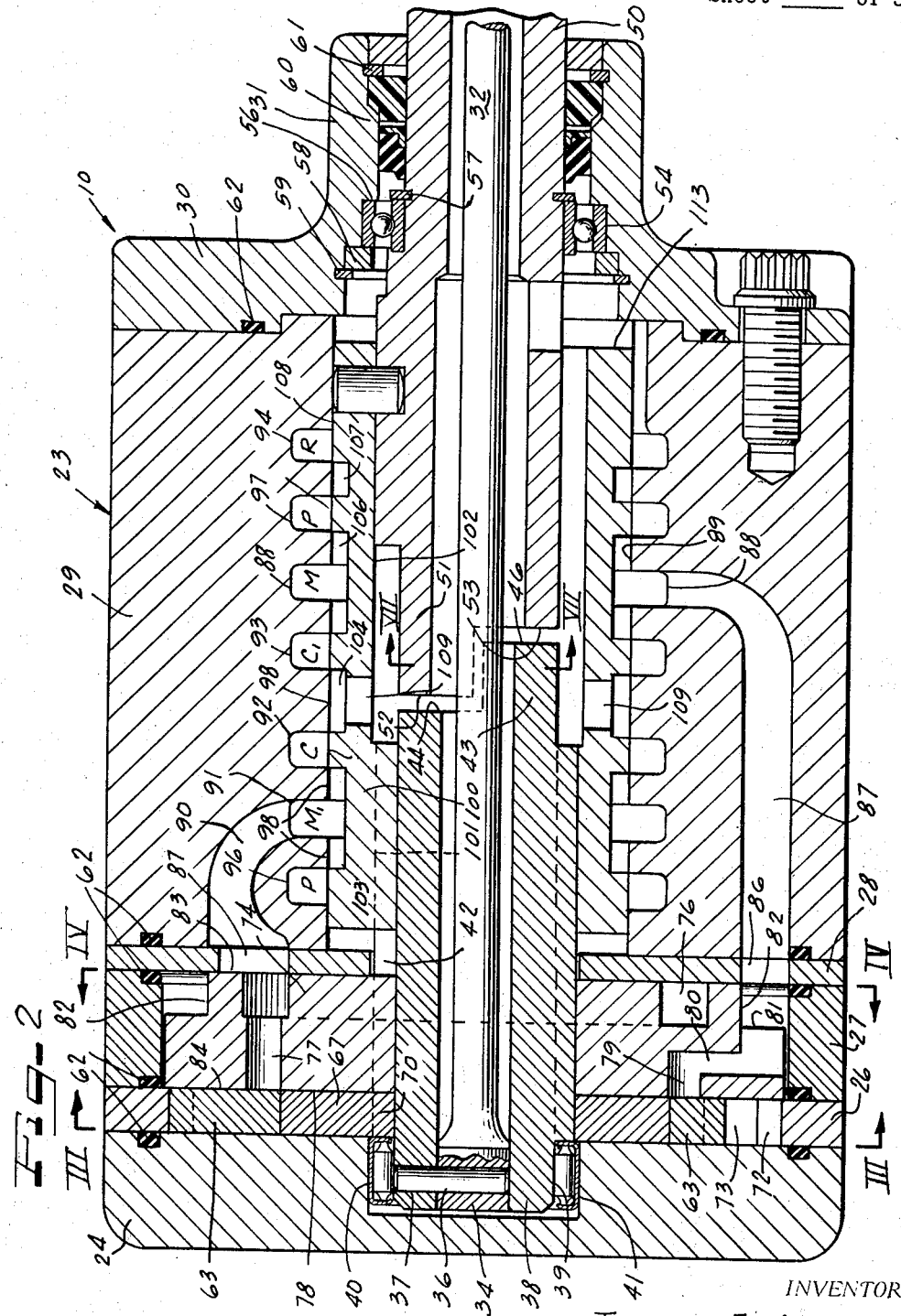

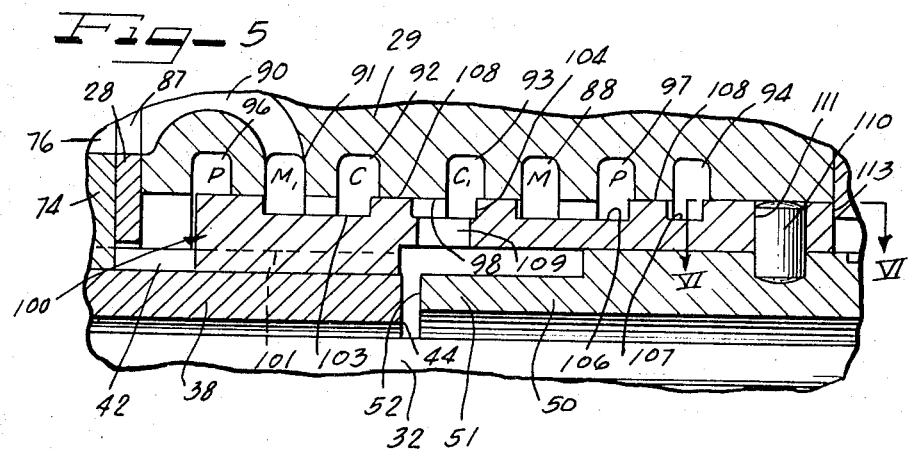
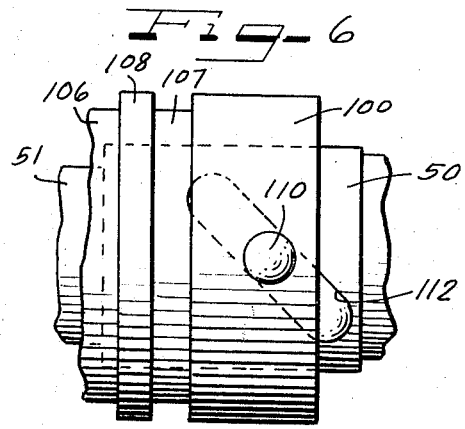
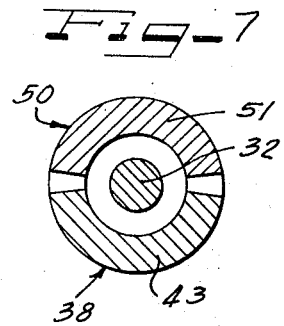
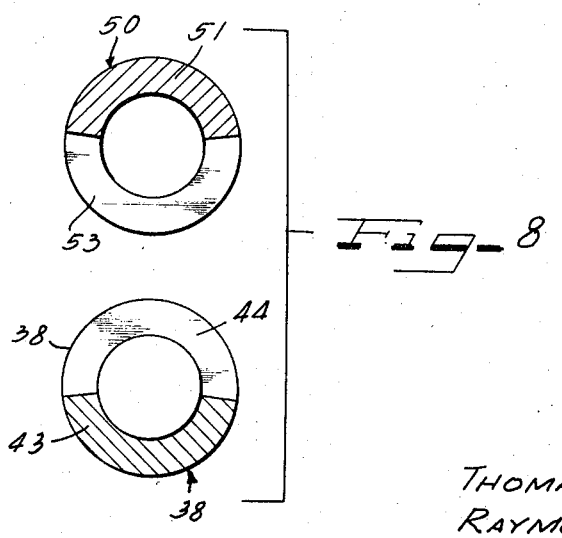

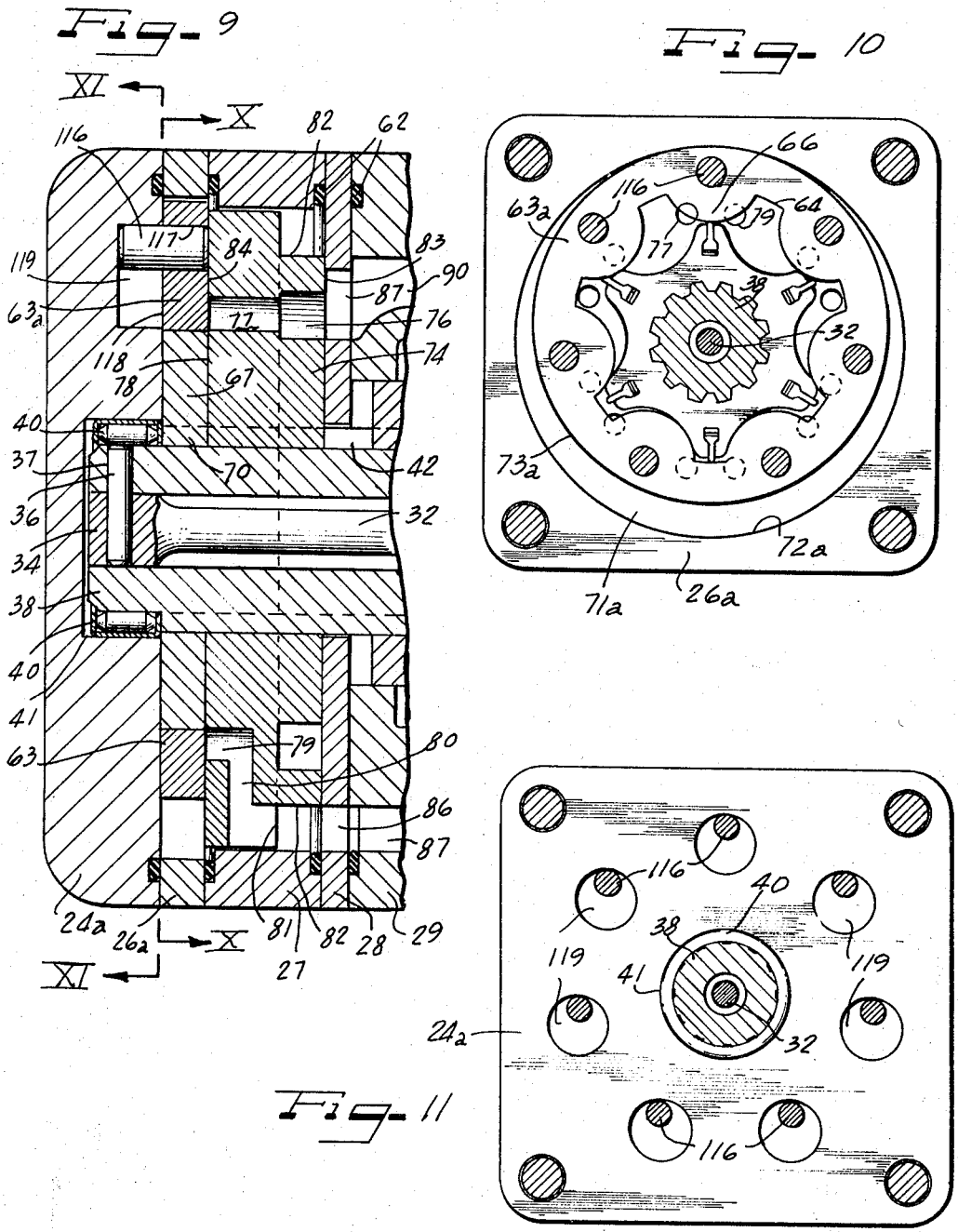

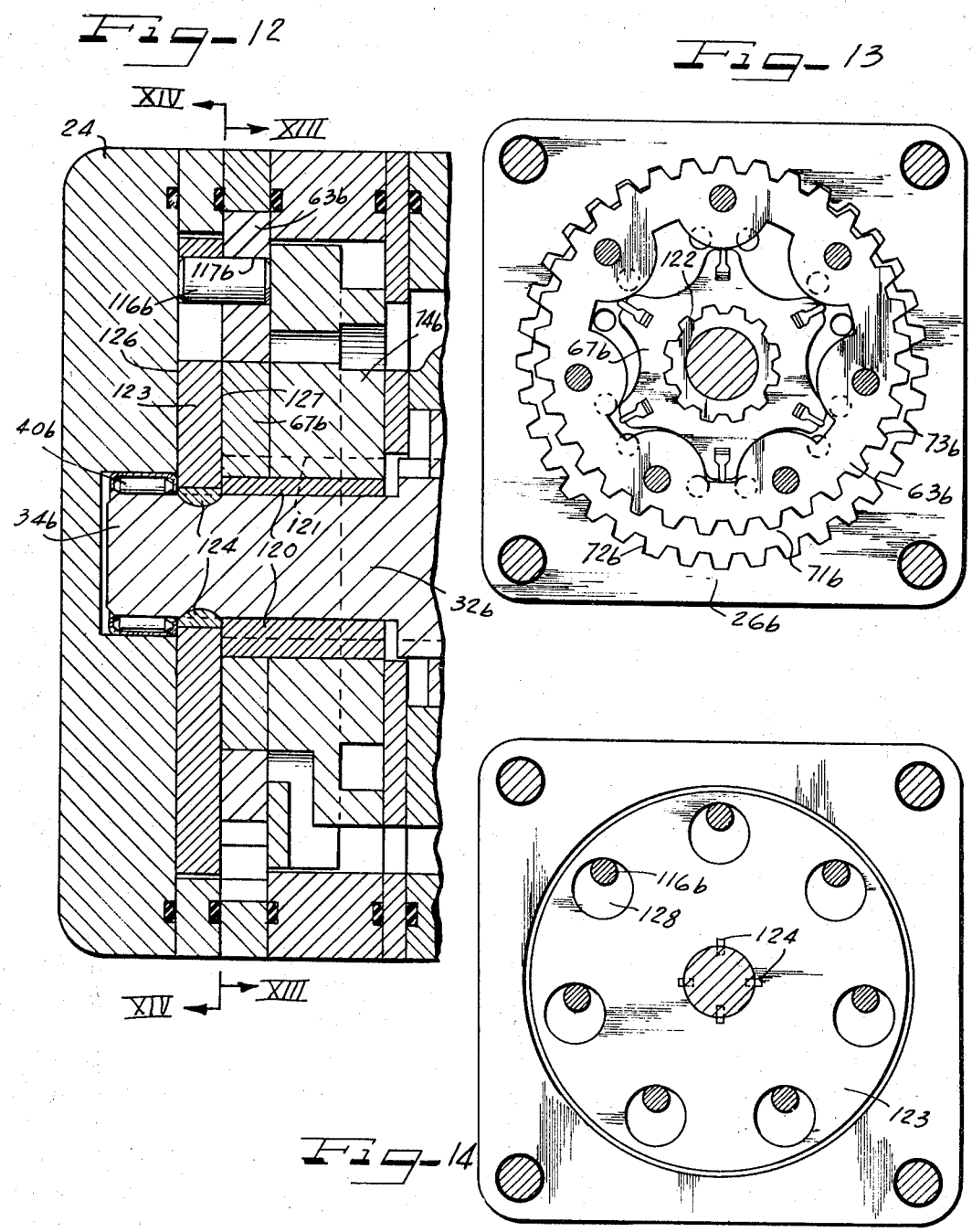

United States Patent Office 3,443,378
Patented May 13, 1969

3,443,378
HYDROSTATIC SINGLE UNIT STEERING SYSTEM
Thomas I. Monroe, West Lafayette, and Raymon L. Goff, Lafayette, Ind., assignors to TRW Inc., Cleveland, Ohio, a corporation of Ohio
Filed Apr. 4, 1967, Ser. No. 628,427
Int. Cl. F15b 9/02; F16h 41/00; B62d 5/08
U.S. Cl. 60—52                                                28 Claims

ABSTRACT OF THE DISCLOSURE

A power steering system using a balanced cylinder as a power assisting means and receiving oil from a power pump which is engine driven having a single unit hydrostatic device wherein a manual pump is combined with a linear spool valve in a single integral package, the spool valve being of either an open or closed center type. The valve is located between a hand wheel and the pump element and is operated by a torque sensing helical unit which translates the error signal or differential rotation between the hand wheel and the pumping element into axial displacement of the spool valve. The pump element comprises a gerotor gear set including an externally lobed rotor and an internally lobed gear ring. A valve plate rotatable with the rotor and the gear ring has slideably engaging control faces. The valve plate has circumferentially spaced inlet and outlet ports intersecting the radial control face so that the orbiting gear ring actually performs a valving operation as it sequentially covers and uncovers the port holes in the valve plate. The pressure generated by the engine driven pump when throttled by the spool valve displacement is directed into the pump motor unit and causes rotation of the elements.

BACKGROUND OF THE INVENTION

Field of the invention

This invention relates generally to methods and means for providing hydraulic amplification in a power assisting system for steering gear of a dirigible vehicle. This invention relates further to expanding chamber pumping devices and more particularly to pumps and motors having gerotor gear sets with an externally lobed rotor and an internally lobed stator.

Description of the prior art

The prior art is exemplified by Dettlof and Hudgens 3,087,436 and White et al. 3,288,034. Both of such prior art patents show hydrostatic units wherein a pump or motor is characterized by a gerotor gear set arrangement. In Dettlof et al. 3,087,436, a manual hand-operated pump is disposed to be actuated by a steering wheel and is separated from a control valve used to regulate the continuous flow of oil delivered by an engine-driven power pump and wherein the steering linkage is power assistant by a balanced cylinder receiving oil metered thereto by the control valve.

SUMMARY OF THE INVENTION

In accordance with the principles of the present invention, there is provided in an integral one casing package a gerotor gear set and a control valve. The gear set is particularly characterized by utilization therein of an orbiting principle whereby the outer gear member of the gerotor gear set moves through an orbital path and actually performs the valving operation as it sequentially covers and uncovers port holes in an adjacent radial control face of a valve plate or porting plate which is rotatable in unison with the star or rotor of the gerotor gear set.

The control valve of the present invention is operated axially by means of a torque sensing helical actuator. The valve is located between the hand wheel and the pump element and operates to translate the error signal or differential rotation into axial displacement. Thus, the positive displacement mechanism of the gear set operates more as a motor during normal steering movements than it does as a pump. However, it does act as a metering unit in series with the power cylinder.

BRIEF DESCRIPTION OF THE DRAWINGS

FIGURE 2 is a cross-sectional view taken on line II—II and showing details of the hydrostatic unit;

FIGURE 5 is an enlarged fragmentary view showing portions of the control valve also shown in FIGURE 2 but depicting the control valve in a different axial position of adjustment;

FIGURE 6 is a fragmentary view taken on line VI—VI of FIGRUE 5;

FIGURE 7 is a fragmentary cross-sectional view taken on line VII—VII of FIGURE 2;

FIGURE 8 is a similar cross-sectional view taken on line VIII—VIII of FIGURE 2 but showing the respective sleeve members separated to further illustrate the structural details thereof;

FIGURE 9 is a fragmentary view similar to FIGURE 2 but showing a different species of the present invention;

FIGURE 10 is a cross-sectional view taken on line X—X of FIGURE 9;

FIGURE 11 is a cross-sectional view taken on line XI—XI of FIGURE 9;

FIGURE 12 is a view similar to FIGURE 9 but showing still another species of the present invention;

FIGURE 13 is a cross-sectional view taken on line XIII—XIII of FIGURE 12; and

FIGURE 14 is a cross-sectional view taken on line XIV—XIV of FIGURE 12.

DESCRIPTION OF THE PREFERRED EMBODIMENTS

Figure 1:
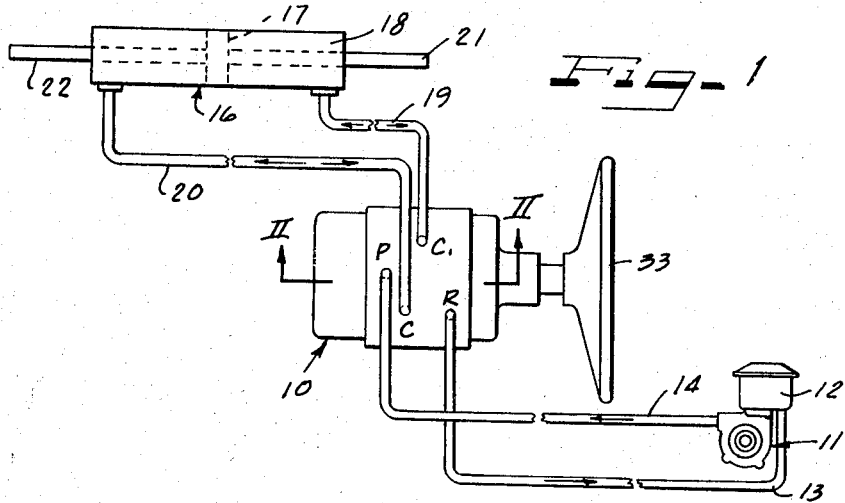
FIG. 1 is a schematic view showing the hydraulic circuitry of a power steering system utilizing a hydrostatic unit operable in accordance with the methods contemplated by the present invention and incorporating the improvements claimed herein.

Referring, first of all, to FIGURE 1 a hydrostatic single unit steering system is shown therein embodying a hydrostatic unit having an integral one casing package in accordance with the principles of the present invention and shown generally at 10. The unit 10 is located at one point in the hydraulic circuitry of a hydraulic circuit formed by conduit means and at another point in the hydraulic circuit there is provided an engine-driven power pump shown generally at 11. The pump 11 has a reservoir 12 connected to a return line 13 and the pump 11 has a discharge line shown at 14. Thus, oil furnished under pressure in the discharge line 14 is metered by a control means in the hydrostatic unit 10 to a balanced cylinder shown generally at 16 and including a piston 17 movable reciprocably in response to pressure supplied to a cylinder 18 on the respective opposite sides of the piston 17. For that purpose, there is provided a conduit 19 and a conduit 20 interconnecting the balanced cylinder 16 and the hydrostatic unit 10. It will be understood that the piston 17 has connected to the opposite sides thereof a piston rod 21 and a piston rod 22 adapted to be operatively connected to appropriate linkage members of the wheels in a dirigible vehicle steering system.

Referring now to FIGURE 2, it will be noted that the hydrostatic unit has an integral one casing package formed by a single casing means indicated generally at 23. More specifically, the casing means 23 includes a cover member 24 and a series of casing rings shown respectively at 26, 27 and 28, all connected in firm assembly with a valve housing 29 and an end member 30 which includes a main plate-like body portion and a reduced diameter hub 31.

A shaft member is shown at 32 and extends inwardly into the interior of the casing means 23. One end of the shaft member 32 is operatively connected to a steering wheel shown in FIGURE 1 at 33 so that the shaft 32 will be bidirectionally operated in response to the driver's steering operation of the steering wheel 33.

At the innermost end of the shaft 32 there is provided an enlarged boss 34 through which extends a locking pin 36 received in a correspondingly sized opening 37 formed in a tubular shaft sleeve 38. The shaft sleeve 38 is generally cylindrical in configuration being provided, however, with an annular recess 39 at the end thereof which accommodates a bearing assembly shown generally at 40 and which in turn is received in a recess 41 formed in the cover member 24, thereby to support and journal the end of the shaft sleeve 38 and the shaft 32 in the casing means 23.

The external peripheral surface of the shaft sleeve 38 is formed with circumferentially spaced spline teeth 42 and at the opposite end of the shaft sleeve 38, there is formed a semi-circular axially projecting portion 43 which is more clearly depicted in FIGURE 8. Thus, the upper end portion of the shaft sleeve 38 has a radial wall 44 and the axially projecting semi-circular portion terminates in a radial wall shown at 46. It will be noted that the axially projecting portion extends through slightly less than 180° of angular arc.

A second shaft sleeve is shown at 50 and includes a corresponding end portion, namely, an axially projecting portion 51 having a radial end face 52 spaced axially from a radial end face 53. The respective end faces 44 and 52 are located in adjoining relationship as are the confronting faces 46 and 53, thereby providing an axial overlap between the shaft sleeve 38 and the shaft sleeve 50.

In order to rotatably journal and support the shaft sleeve 50 in the casing means 23, a bearing assembly is shown generally at 54 seated in a notched recess 56 formed in the end member 30. A snap ring 57 received in a corresponding recess of the shaft sleeve 50 abuts one side of the bearing assembly while an abutment is provided on the other side by a ring member 58 retained in place by a lock ring 59 received in a corresponding recess formed in the end member 30.

A suitable shaft seal is provided between the hub portion 31 and the shaft sleeve 50 and the shaft seal is shown generally at 60 retained in place by a retainer ring 61 received in the internal bore of the hub portion 31.

It will be understood that all of the individual casing members are provided with the usual recesses and sealing means to insure the hydraulic leak-proof integrity of the casing means 23 and such sealing means are exemplified by appropriate O ring members identified by a common reference numeral 62.

Figure 3:
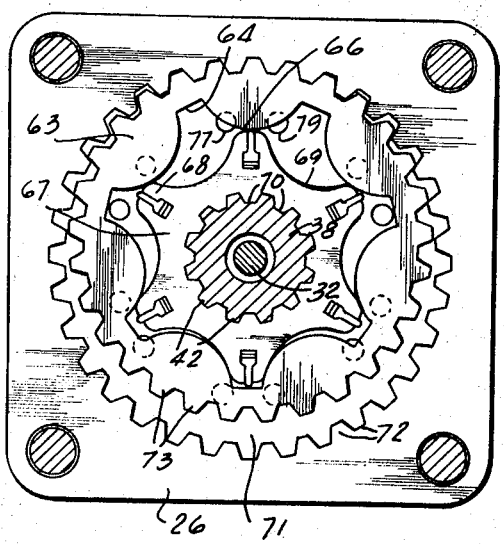
FIGURE 3 is a cross-sectional view taken on line III—III of FIGURE 2.

Referring now to FIGURE 3 in connection with FIGURE 2, it will be noted there is provided a positive displacement mechanism which may conveniently take the form of a gerotor gear set. The gerotor gear set consists of two primary parts, namely, an outer gear ring which may sometimes be referred to as a stator and shown generally at 63. The stator or gear ring 63 is characterized by having formed therein seven concave configurations 64 serving as oil cavities and it has the same number of convex configurations 66, each convex configuration 66 being disposed diametrically opposite a corresponding concave cavity 64.

There is also provided a rotor sometimes referred to herein as a star 67 which has a lesser number of external lobes of a form similar to the stator chambers. In other words, the stator or gear ring 63 is internally toothed or lobed, whereas the rotor or star is externally toothed or lobed. In the exemplary configuration shown, the rotor or star 67 has six outwardly projecting lobes 68 and six concave portions 69 alternately disposed with respect to the lobes 68.

The rotor and stator are in meshed relationship. Therefore, when one rotor lobe 68 is fully in a cavity 64 of the stator 63, its opposite lobe 68 is at the crest of the stator's convex form 66 opposite the cavity. As the rotor 67 is rotated, each lobe 68 in sequence is moved out of its cavity 64 to the crest of the stator's convex form 66, forcing each opposite lobe in sequence into a cavity.

Figure 4:
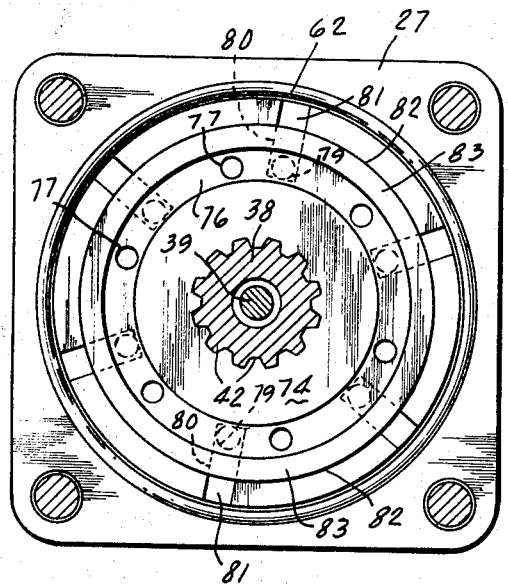
FIGURE 4 is a cross-sectional view taken on line IV—IV of FIGURE 2.

In the form of the invention shown in FIGURES 2, 3 and 4, the rotor 67 is rotationally driven by the shaft 32 and in this regard, it will be noted that the rotor 67 has a centrally disposed opening which is characterized by the formation therein of spline teeth 70 which mesh with the spline teeth 42 on the shaft sleeve 38.

In the form of the invention shown in FIGURES 2, 3 and 4, a casing ring 26 is provided having a generally circular opening 71 which is larger in diameter than the diameter of the stator or gear ring 63. Moreover, the wall of the recess 71 located circumjacent the external peripheral surface of the stator or gear ring 63 is characterized by the formation therein of gear teeth 72. The stator or gear ring 63 is likewise externally toothed as at 73 so that the gear teeth 72 and 73 intermesh. Therefore, the stator 63 is disposed for both rotational movement in the recess 71 as well as for movement in an orbital path. Such orbital and rotational movement will be effected derivatively whenever the rotor 67 is drivingly actuated by the selective bidirectional rotation of the shaft 32 and the shaft sleeve 38.

In accordance with the present invention, there is disposed immediately axially adjacent the rotor 67 and the stator 63 a valve plate or porting plate, indicated generally at 74.

The plate 74 has formed therein a circumferentially continuous annulus 76 formed in one face of the plate 74. Intersecting the bottom wall of the annulus 76 are plural ports 77 which extend axially from the annulus 76 to the opposite radial face of the plate 74 and which radial face operates as a control face and is indicated at 78.

A corresponding plurality of ports are formed in the porting plate 74 and intersect the control face 78 as shown at 79. Each port 79 has the radial leg 80, thereby to permit communication with an opening 81 into the bottom of an annular recess 82 formed in the peripheral edge of the porting plate 74 at the front face thereof, which front face is shown at 83.

It will be noted that the rotor 67 and the stator 63 have axially spaced parallel radial faces one of which is bottomed against a radial wall provided by the cover member 24. Further, it will be noted that the face 78 of the valve plate 74 extends radially outwardly with respect to the rotor 67 and slidably engages the adjoining side face of the stator 63, which side face is shown at 84.

The ports 77 and 79 are disposed in a circumferential row and in a predetermined circumferential spacing relationship radially outwardly of the convex portions 66, thereby to lie in aligned register with the oil cavities formed by the concave configurations 64. Thus, as the stator 63 orbits, it actually performs a valving operation since the relative sliding movement of the control faces 78 and 84 will sequentially cover and uncover the ports 77 and 79, thereby to regulate the ingress and egress of oil to and from the oil cavities 64.

The casing ring shown at 28 is formed with an opening 86 communicating with the annular recess 82 and is further provided with an opening 87 which communicates with the annulus 76. The valve housing 29 of the casing means 23 has a passage 87 formed therein which lies in register with the opening 86 thereby to communicate the annular recess 82 with a valve recess 88 extending circumferentially in a bore wall 89 interiorly of the valve housing 29. The valve housing 29 is also formed with a passage 90 communicating the opening 87 and the annulus 76 with a second annular recess 91 extending circumferentially in the bore wall 89 of the valve housing 29.

The bore wall 89 is provided with an additional series of annular recesses including a pair of recesses 92 and 93 adapted to be connected in hydraulic communication with the cylinder 16, means being provided to connect the recess 92 with the cylinder 16 via the conduit 20 and means being provided to connect the recess 93 with the cylinder 16 via the conduit 19.

A recess shown at 94 is adapted to be connected to the reservoir 12 via the conduit 13. The two remaining recesses are shown at 96 and 97 and both are adapted to be connected to the pump 11 via the conduit 14.

In order to more fully clarify the hydraulic circuitry, it will be noted that on FIGURE 1 the various conduit connections to the pump discharge and to the reservoir are designated by the reference characters P and R, respectively, whereas the conduit connections to the cylinder 16 are identified by the reference character C and $C_1$ respectively. Corresponding character designations are also reproduced in the respective recesses, namely, the letter P in recesses 96 and 97, the reference character R in recess 94, the reference character C in recess 92 and $C_1$ in recess 93. To complete such supplemental identification, the recess 88 is labeled with the character M and the recess 91 is labeled $M_1$.

The recesses in the bore wall 89 of the valve housing 29 are spaced axially from one another thereby to leave a corresponding valve land 98 between each respective pair of recesses.

Slidably and rotatably mounted in the valve bore 89 of the valve housing 29, there is provided a linear spool valve comprising a valve sleeve shown generally at 100. The valve sleeve 100 has an internally splined portion 101 which meshingly engages with the splines 42 on the shaft sleeve 38, thereby to be corotatable therewith. The valve sleeve 100 is generally configured as a tubular cylinder and has an internal bore 102 in which is received the shaft sleeve 50.

The external peripheral surface of the valve sleeve 100 is characterized by the formation therein of a plurality of circumferentially continuous annular recesses shown respectively at 103, 104, 106 and 107, which recesses alternate with land portions shown at 108. Thus, the land portions 108 cooperate with the land portions 98 to develop a valving function upon relative axial movement between the valve housing 29 and the valve sleeve 100.

At the recess 104, the valve sleeve 100 is characterized by a plurality of radial holes 109 which communicate the hollow interior of the valve sleeve 100 with the recess 104.

Referring to FIGURES 2, 5 and 6, it will be noted that a radially inwardly extending pin 110 is connected by means of a press fit in an opening 111 formed in the valve sleeve 100 and projects radially inwardly for camming engagement with the walls of a helical groove 112 formed in the peripheral surface of the shaft sleeve. The helical groove 112 has both circumferential extent as well as axial extent so that relative angular displacement between the shaft sleeve 50 and the valve sleeve 100 will result in a relative axial displacement. Accordingly, the valve sleeve 100 is shown in one position of adjustment in FIGURE 2 wherein all of the lands 108 on the valve sleeve 100 are positioned in register with the corresponding recesses so that the recesses 96, 92, 93, 97 and 94 are closed.

In FIGURE 5, the valve sleeve 100 is axially transposed so that the radial end wall shown at 113 is moved to the limit of its movement determined by engagement with the abutment surface provided by the radial wall of the end member 30.

In operation, the function of the control valve or valve sleeve 100 is to enable the operator to control the direction, flow rate and pressure of the oil required to steer the vehicle.

When the spool or valve sleeve 100 is in the center or neutral position corresponding to the position of the parts as shown in FIGURES 2 and 5, the hydraulic oil from the power pump 11 circulates through the control valve housing 29 directly back to the reservoir 12 with sufficient pressure only to overcome friction of valve channels and lines. This results in no circulation of power pump oil to or from the manual pump, nor to or from the cylinder 16. The corresponding oil pressure at the control valves two cylinder ports C and $C_1$ is low and equal and produces ineffective forces in the cylinder.

Tracing the flow of fluid, it will be noted that the pump 11 operates to supply fluid through the conduit 14 to the hydrostatic unit 10 in the direction of the arrow (FIGURE 1) and fluid is returned to the pump 11 via the conduit 13 in the direction of the arrow (FIGURE 1) via the reservoir 12.

Upon movement of the steering wheel 33 so that the valve element 100 is moved to the left using the orientation of FIGURE 2, fluid under pressure from the pump 11 and supplied via the conduit 14 moves from the recess 96 (P) through the annular recess 103 and into the recess 91 ($M_1$) through the channel 90 and to the gerotor gear set. Fluid leaves the gerotor gear set via the channel 87 and enters the recess 88 (M) whereupon the fluid passes into the recess 93 ($C_1$) through the conduit 19 and into the cylinder 16.

Fluid exhausted from the cylinder 16 via the conduit 20 enters the recess 92 (C) and from the recess 92 passes through the groove 104, the passage 109 from which it communicates throughout the center recess and passes into the recess 94 (R) via the passage 113 and thence returns through the conduit 13 to the suction side of the pump 11 via the reservoir 12.

Upon movement of the valve element 100 to the right, fluid supplied by the pump 11 under pressure passes from the recess 97 (P) through the recess 106 to the recess 88 (M). The fluid then passes from the recess 88 through the channel 87 and into the gerotor gear set whereupon the fluid exits from the gerotor gear set through the channel 90 and into the recess 91 ($M_1$). The fluid then passes through the recess 98 to the recess 92 (C) and from thence through the conduit 20 to the cylinder 16. Fluid exhausted from the cylinder 16 passes through the conduit 19 to the recess 93 ($C_1$), through the recess 104 to the recess 109 and from thence to the recess 113 to the recess 94 (R). The fluid is returned through the conduit 13 to the reservoir 12 and the inlet side of the pump 11.

The driver's steering operation of the steering wheel 33 results in a corresponding operation of the gerotor inner and outer gear sets 67 and 63. However, since the valve is located between the hand wheel 33 and the pump element and is operated by the torque sensing helical unit 110, 112, which translates the error signal or differential rotation between the hand wheel 33 and the pumping element into axial displacement of the valve spool 100, there will be an axial displacement of the valve spool 100 which is a function of that differential rotation.

Thus, the hydraulic pressure generated by the engine driven pump 11 when the flow is throttled by the control valve spool 100 displacement is directed into the pump-motor unit and causes rotation of the elements 63, 67. The positive displacement mechanism acts more as a motor under normal steering movements than it does as a pump while functioning as a metering unit in series with the power cylinder 16.

A portion or all of the high pressure oil from the power pump 11 is circulated from one end of the control valve to and through the metering unit via the passages 87 and 90 and back to the other end of the valve and then to one end of the cylinder 16. The oil from the opposite end of the cylinder 16 flows back to and through the control valve and on to the power pump reservoir 12. That portion of the oil not circulated through the metering unit 63, 67 circulates only through the control valve 100 and back to the power pump reservoir 12. During manual steering, manual effort by the operator increases the hydraulic pressure at the steering cylinder piston to turn the steered road wheels.

In FIGURE 9, another embodiment of the present invention is shown wherein the gear ring or stator is constructed and arranged to move only in an orbital path and is not permitted to rotate as in the form of the invention described in connection with FIGURES 2–4. Most of the components are identical in structure to those already described, however, and accordingly like reference numerals will be used to designate like parts. It will be noted, however, that in the form of the invention shown in FIGURES 9, 10 and 11 the casing ring is shown at 26a and instead of having gear teeth formed therein, the casing ring 26a has a recess 71a which is characterized by a smooth recess wall 72a. In like manner, there is provided in the form of the invention shown in FIGURES 9, 10 and 11 a gear ring or stator 63a which has an outer peripheral surface characterized by a smooth surface 73a. As in the previous form of the invention, the recess 71a is sufficiently larger than the stator 63a to permit relative orbital movement.

In the form of the invention shown in FIGURES 9–11, the gear ring or stator 63a is particularly characterized by a plurality of pins 116 arranged in a circumferential row and each secured by being press fit in firm assembly with the stator 63a in a corresponding opening 117. Each pin 116 projects axially beyond a radial face 118 on the stator 63a and into one of a corresponding plurality of recesses 119 formed in the radial wall surface of the cover member shown at 24a. The recesses 119 in the cover member 24a are circular in configuration but are sufficiently larger than the pins 116 which they receive so that the gear ring or stator 63a will be confined for orbital movement but will be restricted against relative rotational movement.

As in the form of the invention shown in connection with FIGURES 2, 3 and 4, the orbiting stator or ring gear 63a actually performs a valving operation as it sequentially covers and uncovers the port holes 77 and 79 in the adjacent control face 84 of the valve plate 74.

Referring now to the form of the invention shown in FIGURES 12, 13 and 14, the shaft extending into the casing means is shown at 32b and has an end portion 34b supported and journaled for rotation in a bearing 40b received in the cover member 24.

A bearing means in the form of a sleeve bearing 120 is disposed on the shaft 32b, which sleeve bearing 120 has radially outwardly projecting spline teeth 121 meshing with corresponding spline teeth 122 formed on a rotor 67b and a valve plate 74b. Thus, the rotor 67b and the valve plate 74b are locked together for unison rotation but are also free to rotate relative to the shaft 32 by virtue of the bearing relationship therewith.

In this form of the invention, there is provided a driving connection which includes a driving disk member 123 locked for corotation with the shaft 32b by a plurality of key members 124. The driving disk member 123 extends radially outwardly and has one side face 126 slidably engaging the radial wall of the cover member 24 and has a spaced parallel wall portion 127 slidably engaging the adjoining wall surface of the rotor 67b and the stator 63b.

The driving disk member is characterized by a plurality of circular apertures 128 disposed in a circumferential row and sized to be considerable larger in size than a corresponding plurality of pins 116b, there being a corresponding pin 116b for each respective aperture 128. Each of the pins 116b is received in a corresponding opening 117b in press-fit relation so as to be locked in firm assembly with the stator 63b. Thus, upon rotation of the shaft 32b, the driving disk 123 will also rotate in unison therewith and will rotatably drive the stator 63b.

In this form of the invention, the stator 63b is surrounded by a casing ring 26b having a recess 71b and characterized by a recess wall having gear teeth 72b. Likewise, the stator 63b has external gear teeth 73b which mesh therewith.

In the operation of the embodiment shown in FIGURES 12–14, the gear ring or stator 63b is rotatably driven by the driving disk 123 and will therefore orbit within the recess 71b as it is rotatably driven. Moreover, the rotor 67b and the valve plate 74b will also rotate through a derivative rotational action. In this form of the invention, as in the form of the invention described in connection with FIGURES 2 and 9, the orbiting ring gear or stator 63b actually performs the valving operation as the control faces 78b and 84b sequentially cover and uncover the port holes 77b and 79b.

Although minor modifications might be suggested by those versed in the art, it should be understood that we wish to embody within the scope of the patent warranted hereon all such modifications as reasonably and properly come within the scope of our contribution to the art.

We claim as our invention:

1. A hydrostatic device comprising casing means,
   a shaft journaled in said casing means and having spaced coupling portions respectively inside and outside of said casing means,
      said outside coupling portion comprising an input-output connection for use as a motor or as a pump,
   a recess formed in said casing means into which said inside coupling portion extends for rotation on the axis of said shaft,
   an externally lobed star in said recess
   and a porting plate disposed axially adjacent to said star and having parallel radial faces extending radially outwardly of said star,
      both said star and said plate being disposed for unison rotation about the axis of said shaft,
   an internally lobed gear meshing with said star and having a greater number of lobes than said star,
      said gear being smaller than said recess and being disposed therein to travel in an orbital path relative to said axis,
      said gear having a radial side face slidably engaging the adjoining side face of said porting plate to sequentially cover and uncover the port holes,
   thereby controlling the ingress and egress of liquid to and from the spaces between the lobes.

2. A hydrostatic device as defined in claim 1 and further characterized by
   a connector drivingly connecting said shaft to said star and to said porting plate,
   thereby to rotate said star and said porting plate in unison with said shaft,
      the external peripheral surface of said gear and the confronting circumferential wall of said recess having meshing gear teeth formed therein,
   thereby affording rotational and orbital movement of said gear in said recess.

3. A hydrostatic device as defined in claim 1, and further characterized by
   a connector drivingly connecting said shaft to said star and to said porting plate,
   thereby to rotate said start and said porting plate in unison with said shaft,
      said gear and said casing means having interengaging pin and recess means confining said gear against rotation while affording orbital movement of said gear around said axis.

4. A hydrostatic device as defined in claim 1 and further characterized by bearing means between said shaft and said star and between said shaft and said porting plate and journaling said star and said porting plate for rotation about the axis of said shaft, and a driving connection between said shaft and said gear including pin and recess means affording concurrent rotational and orbital movement of said gear around said axis.

5. A hydrostatic device comprising casing means, first and second tubular shaft parts having semicircular segmental portions in axial overlapping register, a third shaft part extending through the center of said first and second shaft parts and connected to said first shaft part at its innermost extremity, an externally lobed star mounted on and connected to said first shaft part for rotation therewith about a common axis of rotation, a disk-shaped valve plate mounted on and connected to said first shaft part and disposed axially adjacent said star for rotation with said first shaft part about said common axis, an annular internally lobed gear having more lobes than said star and disposed radially outwardly of said star in meshing relation therewith, said casing means having a recess of larger size than said gear to permit said gear to orbit around said axis of rotation, said ring having a radial face and said porting plate having an adjoining radial face intersected by axial ports, both of said radial faces together developing a valving operation during the orbiting operation of said gear to sequentially direct liquid to and from the spaces between the lobes of said star and said gear, said casing means having passages formed therein for conducting liquid to and from said ports in said valve plate, a valve sleeve mounted on and connected to said first shaft part for relative axial movement and for rotation therewith about said axis of rotation, said valve sleeve and said casing means having circumferentially extending surfaces forming axially spaced valve lands and grooves for controlling the flow of liquid through said passages, and pin and cam groove means between said valve sleeve and said second shaft part, said groove means having circumferential and axial extent, thereby to adjust the axial position of said valve sleeve in response to the rotational lead or lag of the shaft parts.

6. A hydrostatic device as defined in claim 5 and further characterized by said casing means at said recess and the peripheral surface of said gear having intermeshing gear teeth formed therein to simultaneously rotate said gear during movement thereof in its orbital path.

7. A hydrostatic device as defined in claim 5 and further characterized by said casing means and said gear having interengaging pin and recess means confining said gear against relative rotation while affording orbital movement of said gear.

8. A hydrostatic device comprising casing means, first and second tubular shaft parts having semicircular segmental portions in axial overlapping register, a third shaft part extending through the center of said first and second shaft parts and connected to said first shaft part at its innermost extremity, an externally lobed star, a disk-shaped valve plate, bearing means mounting said star and said plate on said first shaft part for rotation, an annular internally lobed gear having more lobes than said star and disposed radially outwardly of said star in meshing relationship therewith, and a driving connection between said shaft parts and said gear including pin and recess means affording concurrent rotational and orbital movement of said gear around said axis.

9. A hydrostatic device comprising casing means, first and second tubular shaft parts having semicircular segmental portions in axial overlapping register, a third shaft part extending through the center of said first and second shaft parts and connected to said first shaft part at its innermost extremity, rotatable pumping means having valve controlled multiple expansible chambers, a valve sleeve mounted on and connected to said first shaft part for relative axial movement and for rotation therewith about said axis of rotation, said valve sleeve and said casing means having circumferentially extending surfaces forming axially spaced valve lands and grooves for controlling the flow of liquid through said passages, and pin and cam groove means between said valve sleeve and said second shaft part, said groove means having circumferential and axial extent, thereby to adjust the axial position of said valve sleeve in response to the rotational lead or lag of the shaft parts.

10. In combination with a relatively rotatable inner and outer gerotor gear set wherein the outer member of the gear set orbits, the improvement of a valve plate operatively connected to one of said members of said gear set for simultaneous movement therewith and having axial ports formed therein and a radial face intersected by said ports for communicating with the spaces between the lobes of the gear set, and a corresponding radial face on the outer member of said gerotor gear set slidably engaging said radial face to perform a valving function in response to the orbital movement thereof.

11. A power steering system comprising, conduit means forming an hydraulic circuit, a pump at one point in said circuit for driving a supply of liquid through said circuit at increased pressure, a hydrostatic unit at a second point in said circuit having conduit connections to and from said pump, and a steering linkage actuator having power assisting means connected to have hydraulic fluid flow to and from said hydrostatic unit as regulated thereby, said hydrostatic unit comprising an inner and outer gerotor gear set wherein the outer gear of the set orbits, and a valve plate having axial ports formed therein and a radial face intersected by said ports for communicating with the spaces between the lobes of the gear set, a corresponding radial control face on the outer gear of the gerotor gear set slidably engaging said radial face on said valve plate to perform a valve function in response to the orbital movement thereof, means adapted to rotatably drive the gerotor gear set in response to steering signals from a steering wheel actuator, and a servo control valve means for regulating the flow of liquid to said power assisting means in response to differential rotation between the steering wheel actuator and said gerotor gear set.

12. For use in a power steering system, the improvement of a hydrostatic unit having a casing formed with a pump cavity therein, a gerotor gear set in said cavity and having a rotor formed with plural number of external lobes, a stator having a greater number of internal concave configurations serving as oil cavities and a similar number of convex configurations each adapted to be diametrically opposite a concave cavity, said rotor and said stator being disposed so that when one rotor lobe is in a cavity of the stator, its opposite lobe is at the crest of the stator's convex form opposite the cavity, and as the rotor and the stator relatively rotate, each lobe in sequence is moved out of its cavity to the crest of the stator's convex form forcing each opposite lobe in sequence into a cavity, a valve plate axially adjacent said rotor and said stator, said plate and said stator having slidably engaging radial control faces, said plate having circumferentially spaced inlet and outlet ports in communicating alignment with said concave configurations of said stator and intersecting the corresponding radial control face of said plate, and actuator means to relatively rotate said valve plate and said rotor with respect to said casing and to move said stator in an orbital path in said pump cavity, whereby said orbiting stator will develop a valving operation as the radial control faces sequentially cover and uncover said ports to control the ingress and egress of liquid to and from said gear set.

13. The invention of claim 12 and further characterized by said casing further including a valve cavity, and a linear spool valve in said valve cavity for throttling power steering fluid to a power assisting means as a function of the differential rotation between said actuator means and said rotor.

14. The invention of claim 13 and further characterized by said actuating means comprising a hand wheel for bidirectionally actuating said gerotor gear set as a function of steering requirements.

15. The invention of claim 14 and further characterized by means including an engine-driven power pump discharging a supply of oil to said spool valve and a balanced cylinder receiving oil as metered thereto by said gerotor gear set and said spool valve.

16. The invention of claim 12 and further characterized by a shaft journaled in said casing means and having a manual steering wheel operatively connected to a first portion of said shaft, said shaft having a second portion extending into said casing.

17. The invention of claim 16 and further characterized by a tubular shaft sleeve corotatably connected to said shaft and spaced outwardly of said shaft and inwardly of said gerotor gear set and forming said means to relatively rotate said valve plate and said rotor.

18. The invention of claim 17 and further characterized by a coupling connection drivingly connecting said shaft sleeve to said rotor and to said plate, the external peripheral surface of said stator and the circumjacent wall of said recess having meshing gear teeth, thereby affording rotational and orbital movement of said stator in said recess.

19. The invention of claim 17 and further characterized by a coupling connection drivingly connecting said shaft sleeve to said rotor and to said plate, said stator and said casing having interengaging pin and recess means confining said stator against rotation while affording orbital movement of said stator in said recess.

20. The invention of claim 16 and further characterized by bearing means between said shaft and said rotor and between said shaft and said valve plate and journaling said rotor and said valve plate for rotation about the axis of said shaft, and a driving connection between said shaft and said stator including pin and recess means affording concurrent rotational and orbital movement of said stator around the axis of said shaft.

21. The invention of claim 20 and further characterized by said driving connection comprising a disk-shaped driving member corotatably coupled to said shaft and having a circumferential row of circular openings formed therein, and a corresponding number of pins on said stator extending axially into each corresponding circular opening.

22. A fluid controller for controlling the operation of a pressurized fluid-operated device comprising, a controller housing having an inlet for connection to a source of pressurized fluid, an outlet for return of fluid to the source and a pair of fluid ports for communicating with a pair of cooperating ports in the fluid operated device, a hypocycloidal gear set in said housing including an internally toothed gear and a cooperating externally toothed gear within said internally toothed gear, one of said gears being arranged for rotational movement with respect to the other gear for providing relative rotational and orbital movement therebetween and for providing between the gears a succession of alternately expanding and contracting fluid chambers, fluid directing means comprising passageway means and valve means communicating said inlet, said outlet, said ports and said fluid chambers and including, a sleeve valve movable axially in opposite directions from a neutral position for blocking communication between said inlet and said gear set, to first and second operating positions for directing the pressurized fluid from said inlet through said gear set to one of said ports and from the other of said ports to said outlet, the direction of relative rotation of said gears and the direction of the flow of fluid therethrough alternating as said sleeve valve is moved between said first and second operating positions, a control shaft mounted for rotation on said housing, means interconnecting said control shaft and said sleeve valve for shifting said sleeve valve axially from the neutral position to said operating positions as the control shaft is rotated relative to said sleeve in opposite directions of rotation, and a connecting shaft rotatably interconnecting said sleeve valve and said rotatable gear for providing follow-up rotational movements to said sleeve valve relative to said control shaft to tend to return said sleeve to the neutral position thereof, said connecting shaft being in axial alignment with said control shaft.

23. The fluid controller as defined in claim 22 and including, means journalling said rotatable gear and said connecting shaft for joint rotation on a fixed axis of rotation.

24. A fluid controller for a hydrostatic device comprising, a housing having a cylindrical bore formed therein and an inlet, an outlet and a pair of ports communicating with said bore, a hypocycloidal gear set disposed in said housing externally of said bore and including a pair of gears relatively movable orbitably and rotationally to provide expanding and contracting fluid chambers therebetween and commutator valve means associated with said gears for appropriately directing fluid into and out of said fluid chambers in operative sequence, a sleeve valve in said bore shiftable axially alternatively from a neutral position for blocking said gear set from said inlet to first and second axially spaced operating positions for directing fluid in opposite directions from said inlet through said gear set to said outlet, a control shaft mounted for rotation in said housing, coupling means interconnecting said control shaft and said sleeve valve for shifting said sleeve valve axially from said neutral position and between said first and second operating positions in response to relative rotation between said control shaft and said sleeve valve, and means connecting said gear set and said sleeve valve for rotating said sleeve valve in the direction of rotation of said control shaft to provide follow-up axial shifting of said sleeve valve toward the neutral position thereof.

25. The fluid controller as defined in claim 24 wherein said gear set includes a rotatable gear and said connecting means interconnects said rotatable gear and said sleeve valve for joint rotation.

26. The fluid controller as defined in claim 25 wherein said connecting means comprises a rotatable shaft having an axis of rotation in alignment with the axis of rotation of said control shaft.

27. The fluid controller as defined in claim 26 and including, means forming axially overlapping normally angularly spaced abutment surfaces on said control shaft and said connecting means for providing a direct driving relation between said control shaft, said connecting means and said rotatable gear to manually drive said gear as a pump when said control shaft rotates relative to said connecting means through an angle sufficient to bring said abutment surfaces into abutting relation, and torsion means interconnecting said control shaft and said connecting means for biasing said abutment surfaces into spaced relation to bias said sleeve valve to the neutral position thereof.

28. The invention as defined in claim 10 wherein the inner member of the gear set rotates and wherein said valve plate is connected to said inner member of said gear set for unison rotation therewith.

References Cited

UNITED STATES PATENTS

| | | |
|---|---|---|
| 2,984,215 | 5/1961 | Charlson. |
| 2,989,951 | 6/1961 | Charlson _____ 91—81 XR |
| 3,087,436 | 4/1963 | Dettlof et al. _____ 103—130 |
| 3,106,163 | 10/1963 | Mosbacher _____ 103—2 |
| 3,215,043 | 11/1965 | Huber _____ 91—56 |
| 3,288,034 | 11/1966 | White et al. _____ 103—130 XR |
| 3,348,493 | 10/1967 | Easton _____ 103—130 |
| 3,360,932 | 1/1968 | Lech et al. |

EDGAR W. GEOGHEGAN, *Primary Examiner.*

U.S. Cl. X.R.

91—56; 103—130